Patented Feb. 16, 1943

2,311,418

UNITED STATES PATENT OFFICE 2,311,418

MALTOSE AND GALACTOSE FERMENTATIONS

Alfred S. Schultz and Lawrence Atkin, Bronx, and Charles N. Frey, Scarsdale, N. Y., assignors to Standard Brands Incorporated, New York, N. Y., a corporation of Delaware No Drawing. Application September 16, 1939, Serial No. 295,272

5 Claims. (Cl. 195—37)

The invention relates to the fermentation of the saccharides maltose and galactose.

More particularly it is concerned with a process wherein fermentation of these saccharides is augmented, and includes correlated improvements and discoveries whereby their fermentation is initially enhanced.

The rates of fermentation of maltose and of galactose have been found to be initially markedly slower than that of dextrose, and whereas dextrose fermentation starts promptly and continues at a rapid rate, that of maltose and galactose starts relatively slowly. The maltose and galactose rates, however, will usually increase slowly until after an interval they will approximate that of dextrose. When using maltose or galactose as the carbohydrate material to be fermented, it is desirable to have the fermentation rate reach its maximum as quickly as possible, and it is an object of this invention to provide a procedure whereby such result may be attained.

A further object of the invention is to provide a procedure whereby fermentation of maltose and of galactose may be facilitated by contacting the medium with an ambient atmosphere containing oxygen in an amount greater than that in air.

Another object of the invention is the provision of a process for accelerating the initial fermentation of maltose and galactose in a manner which may be easily, effectively and economically practiced.

A specific object of the invention provides a process in which the fermentation medium or solution is in contact with an atmosphere of pure oxygen.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention a fermentation medium as an aqueous solution, especially a non-starchy solution containing a carbohydrate belonging to the group consisting of maltose and galactose, and yeast may be prepared by dissolving the carbohydrate in suitable amount in water, and introducing yeast thereinto, desirably by means of a suspension thereof in water. More especially, the carbohydrate, i. e., maltose or galactose, is present in the solution in a preponderant amount.

The fermentation medium may contain yeast assimilable salts, particularly nitrogen compounds, and especially ammonium salts, for example, ammonium sulfate and an ammonium phosphate, and the like. Moreover, the medium may include buffer salts whereby the pH will be held at a substantially constant and desired value. When the medium undergoes fermentation, we have found that a distinct shortening in the initial or induction period of the fermentation is attained by having the medium in contact with an ambient atmosphere containing oxygen in an amount greater than that which is present in the air. More especially, and preferably, the ambient atmosphere consists of pure oxygen.

We have found that the quantity of oxygen necessary to accelerate the initial fermentation varies according to the volume of the medium, shape of the container, and the degree of agitation to which the medium is subjected. Thus, for example, the greater the volume of the solution or medium the larger will be the quantity of oxygen required. Additionally, the contact between the fermentation medium and the oxygen may be accomplished by bubbling the oxygen therethrough. It will be realized, of course, that both manners may be utilized, i. e., superimposing an atmosphere of substantially pure oxygen and bubbling oxygen through the medium. Moreover, the acceleration of the initial fermentation rate of maltose and of galactose through the influence of oxygen is accelerated over a pH range of from 2.6 to 6.4. The desired pH value may be established through use of a proper buffer solution, and satisfactory results pertain when this value is about 5.36.

As an illustrative embodiment of a manner in which the invention may be practiced, the following examples are presented:

Example I

Determination of the rate of fermentation may be effected by preparing a suitable solution, placing this in a bottle or flask, and ascertaining the rate and quantity of gas evolved. The gas evolved is collected at atmospheric pressure and desirably by displacement of a 10% calcium chloride solution, with the reaction mixture being shaken and maintained at a temperature of about 30° C. The fermentation medium or solution may be made to a total volume of about 100 ml. This may be occasioned by dissolving 3 grams of maltose in water, adding thereto about 3 grams of fresh compressed yeast, previously mixed with water to a volume of about 25 ml., and making up to a final volume of 100 ml. The medium preferably contains also a yeast assimilable nitrogen compound, as an ammonium salt, and hence the above medium may contain 0.9 gram ammonium dihydrogen phosphate and 0.36 gram diammonium hydrogen phosphate. The medium in the bottle or flask is in contact with an ambient atmosphere containing pure oxygen and formed by displacing the air by oxygen. When the fermentation rate, as indicated by the gas evolution at the end of three hours, is observed and compared with the fermentation rates of similar solutions, but in which the ambient atmosphere is in one case air and in another nitrogen, it is found that the rate of the medium in contact with oxygen is decidedly greater.

*Example II*

A medium like unto that described in Example I was prepared with the exception that galactose was included as the carbohydrate in place of maltose. Like conditions pertained, and a marked acceleration of the initial rate of fermentation was observed.

*Example III*

The rate of fermentation was determined as in Example I, the fermentation solution being made up to a volume of about 80 ml. This was prepared by dissolving 3 grams of maltose, or of galactose, in water and adding thereto 10 ml. of a yeast suspension containing 0.8 gram of yeast; 10 ml. of a buffer salt solution prepared by dissolving 46 grams sodium dihydrogen phosphate and 70 grams of citric acid in water and adding sodium hydroxide to give a pH value of about 5.36 with a dilution to 1 liter; 15 ml. of a nutrient salt solution containing ammonium sulfate 150 mg., magnesium sulfate 150 mg., potassium chloride 50 mg., thiamin 100 gamma and nicotinic acid 1 mg., and water to make a volume of 80 ml. The fermentation rates were observed when the solutions were in contact with pure oxygen; with air, and with nitrogen. That solution which was in contact with oxygen showed a decided acceleration in the initial fermentation rate, as is indicated by the following results:

| Carbohydrate | Ml. of gas | | | |
|---|---|---|---|---|
|  | 1.5 hrs. | 2 hrs. | 2.5 hrs. | 3 hrs. |
| Maltose in nitrogen | 10 | 15 | 20 | 30 |
| Maltose in air | 25 | 60 | 106 | 170 |
| Maltose in oxygen | 55 | 115 | 200 | 290 |
|  | 7 hrs. | 8 hrs. | 9 hrs. | 10 hrs. |
| Galactose in nitrogen | 2 | 3 | 3 | 5 |
| Galactose in air | 3 | 8 | 18 | 28 |
| Galactose in oxygen | 42 | 88 | 150 | 227 |

Thus, taking the gas evolution for maltose at three hours, it is evident that contact with an ambient atmosphere of oxygen greatly increases the fermentation rate, since in nitrogen 30 ml. were evolved, in air 170 ml., and in oxygen 290 ml. A similar effect pertains in the fermentation of galactose, as illustrated by the ml. of gas evolved after ten hours; that in nitrogen being 5, in air 28, and in oxygen 227.

The foregoing procedures hence provide a ready method whereby the initial fermentation rate of maltose and of galactose may be accelerated, and this is effectively accomplished by contacting the fermentation solution with an ambient atmosphere containing oxygen in an amount greater than that which is present in air, and preferably pure oxygen. Further, the acceleration is effective at different pH values, as from 2.6 to 6.4, with a distinctive acceleration being noted at a value of about 5.36.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

1. A process for increasing the fermentation rate of the saccharides maltose and galactose, which comprises effecting fermentation of the saccharide by yeast under agitation in an aqueous solution in contact during the initial fermentation period with an ambient atmosphere containing oxygen in an amount greater than that in air whereby the initial fermentation rate is accelerated.

2. A process for increasing the fermentation rate of the saccharides maltose and galactose, which comprises effecting fermentation of the saccharide by yeast under agitation in an aqueous solution in contact during the initial fermentation period with an ambient atmosphere of pure oxygen whereby the initial fermentation rate is accelerated.

3. A process for increasing the fermentation rate of the saccharides maltose and galactose, which comprises effecting fermentation of the saccharide by yeast under agitation in an aqueous solution having a pH value of 2.6 to 6.4 and in contact during the initial fermentation period with an ambient atmosphere containing an amount of oxygen greater than that in air whereby the initial fermentation rate is accelerated.

4. A process for increasing the fermentation rate of the saccharides maltose and galactose, which comprises effecting fermentation of the saccharide by yeast under agitation in an aqueous non-starchy solution having a pH value of 5.36 and in contact during the initial fermentation period with an ambient atmosphere of pure oxygen whereby the initial fermentation rate is accelerated.

5. A process for increasing the fermentation rate of the saccharides maltose and galactose, which comprises effecting fermentation of the saccharide by yeast under agitation in an aqueous solution through which pure oxygen is bubbled during the initial fermentation period whereby the initial fermentation rate is accelerated.

ALFRED S. SCHULTZ.
LAWRENCE ATKIN.
CHARLES N. FREY.